June 25, 1940.　　　　H. SCHERENBERG　　　2,205,751
DIESEL ENGINE
Filed Oct. 21, 1937

INVENTOR:
Hans Scherenberg
By
Attorneys

Patented June 25, 1940

2,205,751

UNITED STATES PATENT OFFICE 2,205,751

DIESEL ENGINE

Hans Scherenberg, Stuttgart-Unterturkheim, Germany, assignor to Daimler-Benz Aktiengesellschaft, Stuttgart-Unterturkheim, Germany Application October 21, 1937, Serial No. 170,179
In Germany November 4, 1936

5 Claims. (Cl. 123—33)

This invention relates to Diesel engines of the precombustion chamber type, and has for an object to improve the conformation of the parts of the precombustion chamber to facilitate rapid discharge of the contents thereof into the main combustion space.

Another object is to improve the precombustion chamber elements of such engines so as to reduce the resistance to flow produced by said elements without interfering with the normal functions of said precombustion chamber elements.

A further object is to improve such precombustion chamber engines formed with a heat storing core and passages surrounding said core in such a manner that the change of direction of gases flowing from the precombustion chamber to the main combustion space is reduced to a minimum so as to reduce the resistance of flow of said gases.

Further objects relate to the provision of suitable heat insulating means.

Other objects and advantages are apparent from consideration of the specification as illustrated by the accompanying drawing of possible embodiments of the invention, in which drawing.

Figure 1:
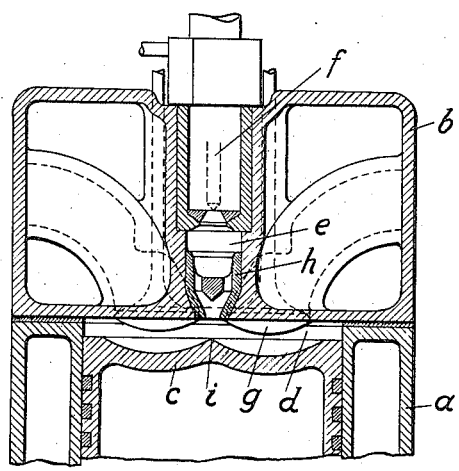
Fig. 1 shows in cross-section a portion of an engine comprising one illustrative embodiment of the invention.

In Fig. 1, $a$ indicates a cylinder of any suitable construction, $b$ a suitable cylinder head therefor, $c$ a piston of usual construction or of special construction as referred to hereinafter, $d$ the main combustion space, $e$ the precombustion chamber space, and $f$ the fuel injection nozzle. As shown, the precombustion chamber is axially aligned with the cylinder and with the precombustion chamber space and its axis is located between the intake and exhaust valves $g$, of which there may be, if desired, a total of four arranged concentrically with respect to the axis of the nozzle. The precombustion chamber is shown provided with an exit port to the main combustion space within which is contained the insert $h$. As shown in Fig. 1, the piston is formed with a point or edge $i$ in line with the exit port against which the contents of the precombustion chamber are directed. As shown, the bounding surface of the piston is formed with an annular depression (of slight depth) or with a plurality of depressions, so that the mixture ejected from the precombustion chamber is distributed evenly throughout the main combustion space.

The exit from the precombustion chamber could, of course, also communicate with the main combustion space or into another space so that the stream from the precombustion chamber will be uninterrupted, which is sometimes of advantage with transverse precombustion chambers.

Figure 2:
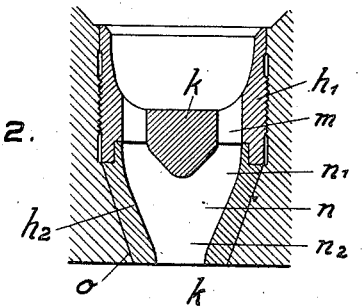
Fig. 2 shows on an enlarged scale the burner, or precombustion chamber insert, shown in Fig. 1.
Figure 3:
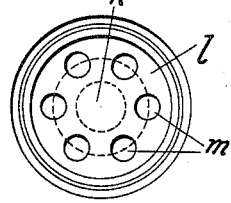
Fig. 3 is a top view of the insert shown in Fig. 2.

Figs. 2 and 3 show the form of construction of the burner or insert $h$, according to Fig. 1. The insert is shown as consisting of two parts $h_1$ and $h_2$ of which the upper part $h_1$ carries the inner heat storing core piece $k$ by means of the webs $l$ which remain between the six surrounding bores $m$. The lower part $h_2$ is in the form of a nozzle, which for the purposes of this case is defined as a gradually converging tube as contrasted with an orifice, and contains the channel $n$ which is composed of the ring channel surrounding the lower pointed part of the core piece, which channel gradually decreases in diameter toward the mouth $n_2$. The ring channel $n_1$ is so formed that the bores $m$ are tangential thereto and its walls are so gradually curved that the contents of the precombustion chamber streaming out of the bores $m$ are led out of the exit opening $n_2$ and into the main combustion space in the form a convex nozzle. The passages are so formed that the flow of the gases occurs without sudden changes in direction and therefore with the least possible resistance. By this means a channel conformation is provided which operates like a nozzle. The maximum angle between the outer wall surface of the channel to the axis thereof (as well as of the precombustion chamber) does not amount to more than about 30°.

Figure 4:
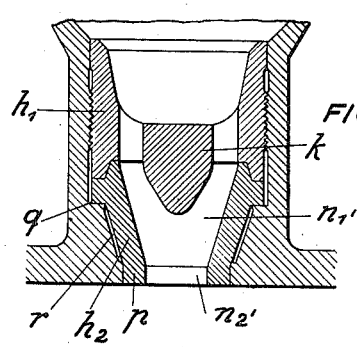
Fig. 4 is a view similar to Fig. 2 showing a modified form.

Fig. 4 shows a somewhat simplified form of the insert. The ring channel $n_{1'}$, is in this case substantially in the form of a steep cone, the half apex angle of which is about 24° in the form shown, which conical wall with a little rounding of the edges gradually joins the exit opening $n_{2'}$, the channels $n_1$ and $n_2$ thereby forming a conical nozzle. This channel formation, although not continuously curved, is satisfactory in many cases. The core piece $k$ may in this case, as well as in other cases, be formed as a somewhat more slender and pointed cone.

The burner which may for example be screw threaded into the cylinder head, as in Fig. 2, may be formed with a conical seat $o$ or, as in Fig. 4, with a cylindrical junction $p$, in which case a shoulder $q$ is provided as an abutment in the axial direction. If desired, a heat insulating annular air space r may be provided, as in Fig. 4. Similar heat insulating spaces as r, Figs. 3 and 4, may be provided.

It will be seen that the constructions shown and described will serve admirably to accomplish the objects stated above in that the conformation of the passages is such as to offer a minimum of resistance to the effluent gases and thus permit rapid emptying of the precombustion chamber contents into the main combustion space.

By means of the invention an improved efficiency is achieved, viz., a reduced fuel consumption with the same output of the engine. This improved efficiency, which has been shown by tests, is attributable to the fact that by means of the nozzle shaped conformation of the connecting channel, the precombustion chamber is emptied more quickly and more thoroughly and, secondly, because a more powerful agitation and atomization of the fuel in the main combustion space takes place. Hereby a more powerful stream is ejected into the main combustion space, and, in fact, the results, as proven by tests, are the more favorable the more compact the ejection stream, i. e., speaking generally, the greater the distance from the exit port to the point of maximum contraction of the stream (under conditions of free uninterrupted flow).

In view of the more rapid emptying of the precombustion chamber an engine equipped with the invention is particularly well adapted for high speed operation. It has further been ascertained that the advantages of the invention are particularly noticeable in the case of engines which work with overload.

It is to be understood, however, that the construction disclosed above is intended merely as illustrative of the invention and not as limiting as various modifications therein may be made without departing from the invention as defined by a proper interpretation of the claims which follow.

I claim:

1. In an internal combustion engine of the Diesel type, a main combustion space, a precombustion chamber communicating therewith, means for injecting fuel into said precombustion chamber, means intermediate said precombustion chamber and said main combustion space comprising a heat storing core piece, a plurality of passages adjacent said core piece communicating with said precombustion chamber, and a nozzle connected to said passages and discharging into said main combustion space, said nozzle comprising a conduit connecting said passages with said main combustion space, said conduit converging gradually to a point near its end adjacent the main combustion space and formed with a substantially cylindrical portion at its end adjacent the main combustion space.

2. In an internal combustion engine of the Diesel type, a main combustion space, a precombustion chamber communicating therewith, means for injecting fuel into said precombustion chamber, means intermediate said precombustion chamber and said main combustion space comprising a heat storing core piece, a plurality of passages adjacent said core piece communicating with said precombustion chamber and a nozzle connected to said passages and discharging into said main combustion space, said nozzle comprising a conduit connecting said passages with said main combustion space, said conduit converging gradually to a point near its end adjacent the main combustion space, the inner surface of said conduit following a smooth curve the first portion of which is concave and the portion of which near the main combustion space is convex.

3. In an internal combustion engine of the Diesel type, a main combustion space, a precombustion chamber communicating therewith, means for injecting fuel into said precombustion chamber, means intermediate said precombustion chamber and said main combustion space comprising a heat storing core piece, a plurality of passages adjacent said core piece communicating with said precombustion chamber and a tubular nozzle connecting with said passages and with said main combustion space, the diameter of said tubular nozzle being gradually reduced in size toward the main combustion space and the inner wall thereof being continuously curved from its junction point with said passages to its exit point into the main combustion space, the outermost parts of the inner surfaces of said passage being tangential to the inner surface of said tubular nozzle.

4. In an internal combustion engine of the Diesel type, a main combustion space, a precombustion chamber communicating therewith, means for injecting fuel into said precombustion chamber, means intermediate said precombustion chamber and said main combustion space comprising a heat storing core piece, a plurality of passages adjacent said core piece communicating with said precombustion chamber and a tubular nozzle connected to said passages and discharging into said main combustion space, the said tubular nozzle being gradually and continuously reduced in diameter toward the main combustion space in such a manner that the maximum inclination of the wall of said nozzle relative to its axis is at no point greater than about 30°.

5. In an internal combustion engine of the Diesel type, a main combustion space, a precombustion chamber communicating therewith, means for injecting fuel into said precombustion chamber, means intermediate said precombustion chamber and said main combustion space comprising a heat storing core piece located at some distance from the main combustion space, a plurality of passages adjacent said core piece communicating with said precombustion chamber and a tubular nozzle connected to said passage and discharging into said main combustion space, the said tubular nozzle being gradually and continuously reduced in diameter toward the main combustion surface and the end of said core piece nearest said main combustion space being positioned at a distance from the tip of said nozzle which is greater than the diameter of the tip of said nozzle.

HANS SCHERENBERG.